(12) United States Patent
Xu et al.

(10) Patent No.: US 11,249,244 B2
(45) Date of Patent: Feb. 15, 2022

(54) BACKLIGHT MODULE AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Jun Xu, Beijing (CN); Qing Zhang, Beijing (CN); Shounian Chen, Beijing (CN); Shouzheng Wu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 511 days.

(21) Appl. No.: 16/063,213

(22) PCT Filed: Nov. 17, 2017

(86) PCT No.: PCT/CN2017/111664
§ 371 (c)(1),
(2) Date: Jun. 15, 2018

(87) PCT Pub. No.: WO2018/218888
PCT Pub. Date: Dec. 6, 2018

(65) Prior Publication Data
US 2020/0271852 A1 Aug. 27, 2020

(30) Foreign Application Priority Data
May 27, 2017 (CN) .......................... 201710391472.8

(51) Int. Cl.
F21V 8/00 (2006.01)
G02F 1/1334 (2006.01)
G02F 1/1337 (2006.01)

(52) U.S. Cl.
CPC ........... *G02B 6/0088* (2013.01); *G02B 6/003* (2013.01); *G02B 6/0031* (2013.01);
(Continued)

(58) Field of Classification Search
CPC .. G02B 6/0038; G02B 6/0031; G02B 6/0055; G02B 6/0088; G02B 6/0091; G02B 6/0068; G02F 1/133606; G02F 1/133605
See application file for complete search history.

(56) References Cited

U.S. PATENT DOCUMENTS 9,146,419 B1 * 9/2015 Anandan .............. G02B 6/0073
2005/0286266 A1 * 12/2005 Park ..................... G02B 6/0038
362/615
(Continued)

FOREIGN PATENT DOCUMENTS

CN 1474214 A 2/2004
CN 104534304 A 4/2015
(Continued)

OTHER PUBLICATIONS

International Search Report and Written Opinion for International Appl. No. PCT/CN2017/111664, dated Feb. 24, 2018.
First Office Action for CN Appl. No. 201710391472.8, dated Nov. 25, 2019.

*Primary Examiner* — Jessica M Merlin
(74) *Attorney, Agent, or Firm* — Dinsmore & Shohl LLP

(57) ABSTRACT

The present disclosure relates to a backlight module and a display device. The backlight module comprises a light guide plate and a light-emitting assembly configured to emit light rays and cause the light rays as emitted to be incident to the light guide plate in parallel. The light guide plate
(Continued)

further comprises a light incident surface, a bottom surface, a light emitting surface on the top thereof, and at least one reflective sloped surface. The reflective sloped surface is positioned between the bottom surface and the light emitting surface, and an angle between the at least one reflective sloped surface and a plane of the bottom surface extending in a direction away from the light incident surface is less than 90°. The light incident surface is located on a side of the light guide plate.

18 Claims, 2 Drawing Sheets

(52) U.S. Cl.
CPC ......... *G02B 6/0068* (2013.01); *G02B 6/0091* (2013.01); *G02F 1/1334* (2013.01); *G02F 1/1337* (2013.01); *G02F 1/133738* (2021.01)

(56) References Cited

U.S. PATENT DOCUMENTS

| 2012/0008067 | A1* | 1/2012 | Mun | G02B 6/003 |
| | | | | 349/65 |
| 2015/0260899 | A1* | 9/2015 | Cheol | G02B 6/0036 |
| | | | | 362/606 |
| 2016/0161823 | A1* | 6/2016 | Kim | G02B 30/27 |
| | | | | 349/15 |

FOREIGN PATENT DOCUMENTS

| CN | 105549238 A | 5/2016 |
| CN | 105842923 A | 8/2016 |
| CN | 105954933 A | 9/2016 |
| CN | 106405932 A | 2/2017 |
| CN | 107300806 A | 10/2017 |
| JP | 2001147329 A | 5/2001 |

\* cited by examiner

BACKLIGHT MODULE AND DISPLAY DEVICE

CROSS-REFERENCE TO RELATED APPLICATIONS

The present patent application claims priority under 35 U.S.C. § 371 to International Patent Application No. PCT/CN2017/111664 filed on Nov. 17, 2017, which claims the benefit of priority to Chinese patent application No. 201710391472.8 filed on May 27, 2017, the disclosure of each of which is hereby incorporated by reference into the present application for all purposes.

TECHNICAL FIELD

The present disclosure relates to a backlight module and a display device.

BACKGROUND

With the development of technologies, portable mobile terminals such as computers and mobile phones have become necessities of people's work and life. However, Due to great opportunities of the use of portable mobile terminals in an open space or public place, it is difficult to give consideration to privacy.

SUMMARY

An embodiment of the present disclosure provides a backlight module comprising a light guide plate and a light-emitting assembly configured to emit light rays and cause the light rays as emitted to be incident to the light guide plate in parallel. The light guide plate further comprises a light incident surface on a side surface thereof, a bottom surface at the bottom thereof, a light emitting surface on the top thereof, and at least one reflective sloped surface. The reflective sloped surface is positioned between the bottom surface and the light emitting surface, and an angle between the at least one reflective sloped surface and a plane of the bottom surface extending in a direction away from the light incident surface is less than 90°.

In some embodiments, the light-emitting assembly comprises a light-emitting device and a reflector that has a parabolic structure to encapsulate the light-emitting device. The light-emitting device is positioned on a side of the light guide plate near the light incident surface, and a light-emitting layer of the light-emitting device faces away from the light incident surface.

In some embodiments, a center of the light-emitting layer of the light-emitting device is located at a focus position of the parabolic structure.

In some embodiments, the light-emitting assembly comprises a light-emitting device and a collimating lens, wherein the collimating lens is positioned between the light-emitting device and the light incident surface, and the light-emitting layer of the light-emitting device faces the collimating lens.

In some embodiments, a plurality of reflective sloped surfaces are provided, the plurality of reflective sloped surfaces are arranged into multiple stages of reflective sloped surface, and each stage of reflective sloped surface has a different transmittance and/or a different reflectivity.

In some embodiments, each stage of reflective sloped surface comprises one or more reflective sloped surfaces.

In some embodiments, the light-emitting device comprises an LED, an OLED or a laser light source.

In some embodiments, the angle between the at least one reflective sloped surface and the plane of the bottom surface extending in the direction away from the light incident surface is about 45°.

An embodiment of the present disclosure further provides a display device comprising the backlight module according to any of the above technical solutions.

In some embodiments, the display device further comprises a liquid crystal layer for regulating an emission state of the parallel light rays emitted from the backlight module, wherein the liquid crystal layer is arranged above the light emitting surface of the backlight module.

In some embodiments, the liquid crystal layer comprises a polymer dispersed liquid crystal.

In some embodiments, the emission state includes a parallel emission state and a divergent emission state.

In some embodiments, the display device further comprises a panel arranged on the liquid crystal layer.

In some embodiments, the light-emitting assembly comprises a light-emitting device and a reflector that has a parabolic structure to encapsulate the light-emitting device, wherein the light-emitting device is positioned on a side of the light guide plate near the light incident surface, and a light-emitting layer of the light-emitting device faces away from the light incident surface.

In some embodiments, a center of the light-emitting layer of the light-emitting device is located at a focus position of the parabolic structure.

In some embodiments, the light-emitting assembly comprises a light-emitting device and a collimating lens, wherein the collimating lens is positioned between the light-emitting device and the light incident surface, and a light-emitting layer of the light-emitting device faces the collimating lens.

In some embodiments, a plurality of reflective sloped surfaces are provided, wherein the plurality of reflective sloped surfaces are arranged into multiple stages of reflective sloped surface, and each stage of reflective sloped surface has a different transmittance and/or a different reflectivity.

In some embodiments, each stage of reflective sloped surface comprises one or more reflective sloped surfaces.

In some embodiments, the light-emitting device comprises an LED, an OLED, or a laser light source.

In some embodiments, the angle between the at least one reflective sloped surface and the plane of the bottom surface extending in the direction away from the light incident surface is about 45°.

Additional aspects and advantages of the present disclosure will be given in the following, and these will become apparent from the following or be learned through the embodiments of the present solution.

BRIEF DESCRIPTION OF THE DRAWINGS

In order to more clearly describe the technical solutions in the embodiments of this disclosure, a brief discussion of the drawings to be used in the embodiments or in the prior art will be provided below, and it is obvious that the drawings in the following are merely some embodiments of this disclosure, and the present disclosure is not limited to them.

DETAILED DESCRIPTION

Figure 1:
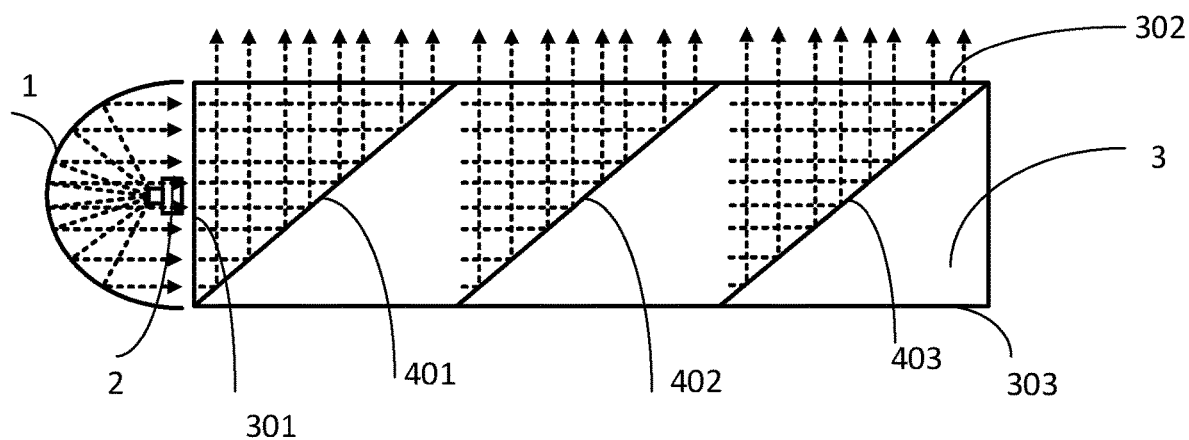
FIG. 1 is a schematic diagram showing a structure of an embodiment of a backlight module according to the present disclosure.

The present disclosure will be further described below in combination with the accompanying drawings and the exemplary embodiments, and examples of the embodiments are shown in the accompanying drawings, wherein throughout, the same or similar reference numerals refer to the same or similar elements or elements having the same or similar functions. The embodiments described with reference to the accompanying drawings below are illustrative, only serve to explain the present disclosure, and cannot be construed as limiting the present disclosure. In addition, if the detailed descriptions of the known technologies are not pertinent to show the features of the present disclosure, they are omitted here.

Those skilled in the art would appreciate that, unless specially stated, the singular form "a", "an", "one", "said" and "the" used herein may also comprise its plural form. It should be further understood that the wording "comprise" used in the description of the present disclosure refers to the presence of the feature, integer, step, operation, element and/or component, but does not exclude the presence or addition of one or more other features, integers, steps, operations, elements, components, and/or a combination thereof.

Those skilled in the art would appreciate that, unless otherwise defined, all the terms (including technical terms and scientific terms) used herein have the same meanings as their general understandings for an ordinary person skilled in the field to which the present disclosure pertains. It should be also understood that those terms defined in common dictionaries should be understood to have the same meanings as those in the context of the prior art, and will not be interpreted in an idealized or too formal sense unless they are specifically defined as here.

With regard to the backlight module, one common design is based on an optically regulatable device arranged on a light guide plate for emitting parallel light. The light guide plate for emitting parallel light is realized mainly by adding an anti-peep film product (e.g., a 3M patent product) to an ordinary light-emitting device or light guide plate. However, realizing the light guide plate for emitting parallel light by using the anti-peep film related products has a large loss of light, whereby the backlight module has a great brightness loss. As far as a display is concerned, the way of ensuring its privacy is primarily to provide an anti-peep effect. A similar anti-peep device such as an anti-peep sheet essentially is a filter to reduce a light exit angle of the inputted light. The anti-peep sheet arranged on the display can reach the function of reducing the angle of view of the display, and thus has the anti-peep effect. However, the additionally installed anti-peep device such as the anti-peep sheet, when in use, must be installed on the display manually, and when not in use, must be manually detached, which brings inconvenient use and poor user experience.

Embodiments of the present disclosure provide a backlight module and a display device, which solve the problem that the backlight module must be additionally provided with the anti-peep film related products such that the light guide plate can emit parallel light, and which can emit parallel light without brightness loss.

FIG. 1 is a schematic diagram showing a structure of an embodiment of a backlight module according to at least one embodiment of the present disclosure. The backlight module comprises a light guide plate 3 and a light-emitting assembly. The light guide plate 3 comprises a bottom surface 303, a light incident surface 301 on a side of the light guide plate 3, an light emitting surface 302 on the top thereof, and at least one reflective sloped surface 401. The light-emitting assembly is configured to emit light rays and cause the light rays as emitted to be incident to the light guide plate 3 in parallel through the light incident surface 301. The reflective sloped surface 401 is positioned between the bottom surface 303 and the light emitting surface 302, and an angle between the reflective sloped surface 401 and a plane of the bottom surface 303 away from an extending direction of the light incident surface 301 is less than 90°. It is not difficult to understand that, the light-emitting assembly emits parallel light to the light incident surface 301, and the parallel light is then reflected by the reflective sloped surface 401 out of the light guide plate 3. Thus, an optical film is not required to be added to the light guide plate 3. Therefore, the light will not be absorbed by the optical film, and the parallel light emitted by the light guide plate 3 does not have a brightness loss. Moreover, Since an optical film material such as the anti-peep sheet is not added, the backlight module is lighter and thinner.

Further, in an embodiment of the present solution, the light-emitting assembly comprises a light-emitting device 2 and a reflector 1 that has a parabolic structure to encapsulate the light-emitting device 2. The light-emitting device 2 is located on a side of the light guide plate 3 near the light incident surface 301, and the light-emitting layer of the light-emitting device 2 faces away from the light incident surface 301. A center of the light-emitting layer of the light-emitting device 2 is located at a focus position of the parabolic structure. A majority of the light emitted by the light-emitting device 2 is reflected out by the reflector 1 having the parabolic structure in the form of parallel light, and enters the light guide plate 3 through the light incident surface 301. Meanwhile, in order to make the light emitted from the light guide plate 3 be parallel light, an angle between the reflective sloped surface 401 and a plane of the bottom surface 303 extending in a direction away from the light incident surface 301 is less than 90°, and the parallel light incident from the light incident surface 301 is then reflected out in parallel. In some embodiments, the angle between the reflective sloped surface 401 and the plane of the bottom surface 303 extending in the direction away from the light incident surface 301 is about 45°, and then, the parallel light reflected out from the reflective sloped surface 401 is emitted perpendicular to the bottom surface 303. It is not difficult to understand that, the light emitted from the light-emitting device 2 is reflected by the reflector 1 having the parabolic structure and then enters the light guide plate 3 in parallel, and the center of the light-emitting layer of the light-emitting device 2 is located at the focus position of the parabolic structure, which increases the light coupling efficiency and further improves the light efficiency of the backlight module in this solution. In some embodiments, the light-emitting device comprises an LED or an OLED and, of course, a light source such as a laser.

In another embodiment of the solution, the light-emitting assembly may comprise a light-emitting device and a collimating lens, wherein the collimating lens is positioned between the light-emitting device and the light incident surface 301, and the light-emitting layer of the light-emitting device faces the collimating lens, and the light emitted by the light-emitting device, after passing through the collimating lens, enters the light guide plate 3 through the light incident surface 301 in the form of parallel light. Of course, those skilled in the art could also adopt a light-emitting assembly having other structures, as long as the light emitted from the light-emitting assembly is incident to the light guide plate 3 in the form of parallel light, and the embodiment in this solution does not constitute a limitation to the solution of this disclosure.

Further, in an embodiment of the solution, a plurality of reflective sloped surfaces are provided, the plurality of reflective sloped surfaces are arranged into multiple stages of reflective sloped surface, wherein each stage of reflective sloped surface has a different transmittance and/or a different reflectivity. In this embodiment, a three-stage of reflective sloped surface case is used as an example to describe the implementation of this solution. That is, a first-stage of reflective sloped surface 401, a second-stage of reflective sloped surface 402, and a third-stage of reflective sloped surface 403 in the figures have different transmittance. Moreover, each stage of reflective sloped surface may comprise a single reflective sloped surface, or multiple reflective sloped surfaces arranged in the extending direction of the light incident surface 301, and the reflective sloped surfaces in the same stage have the same transmittance and reflectivity. Specifically, when the parallel light incident from the light incident surface 301 passes through the first-stage of reflective sloped surface 401, a portion of the light is reflected out from the light emitting surface 302 in parallel, while the other portion of the light is incident into the second-stage of reflective sloped surface 402 through the reflective sloped surface 401. Likewise, a portion of the light is reflected out from the light emitting surface 302 in parallel, while the other portion of the light is incident into the third-stage of reflective sloped surface 403 through the second-stage of reflective sloped surface 402. In an exemplary embodiment of the solution, it is assumed that the intensity of the incident light is I, and the transmittance of the first-state of reflective sloped surface 401, the second-state of reflective sloped surface 402 and the third-state of reflective sloped surface 403 is T1, T2 and T3 respectively, and the reflectivity of these three reflective sloped surfaces is equal to each other, then in order to ensure that the intensity of the light emitted from the three reflective sloped surfaces is uniform, the transmittance must meet the following condition:

$$I*(1-T_1)=I*T_1*(1-T_2)=I*T_1*T_2*(1-T_3).$$

Of course, this embodiment does not constitute a limitation to the solution. It is not difficult to understand that, in the embodiment of this solution, by presetting different transmittance and/or different reflectivity for different stages of the reflective sloped surfaces such that the brightness of the light emitted from different reflective sloped surfaces is the same, homogeneity of the brightness of the light emitted from the light emitting surface of the light guide plate is guaranteed and the user experience is improved.

Figure 2:
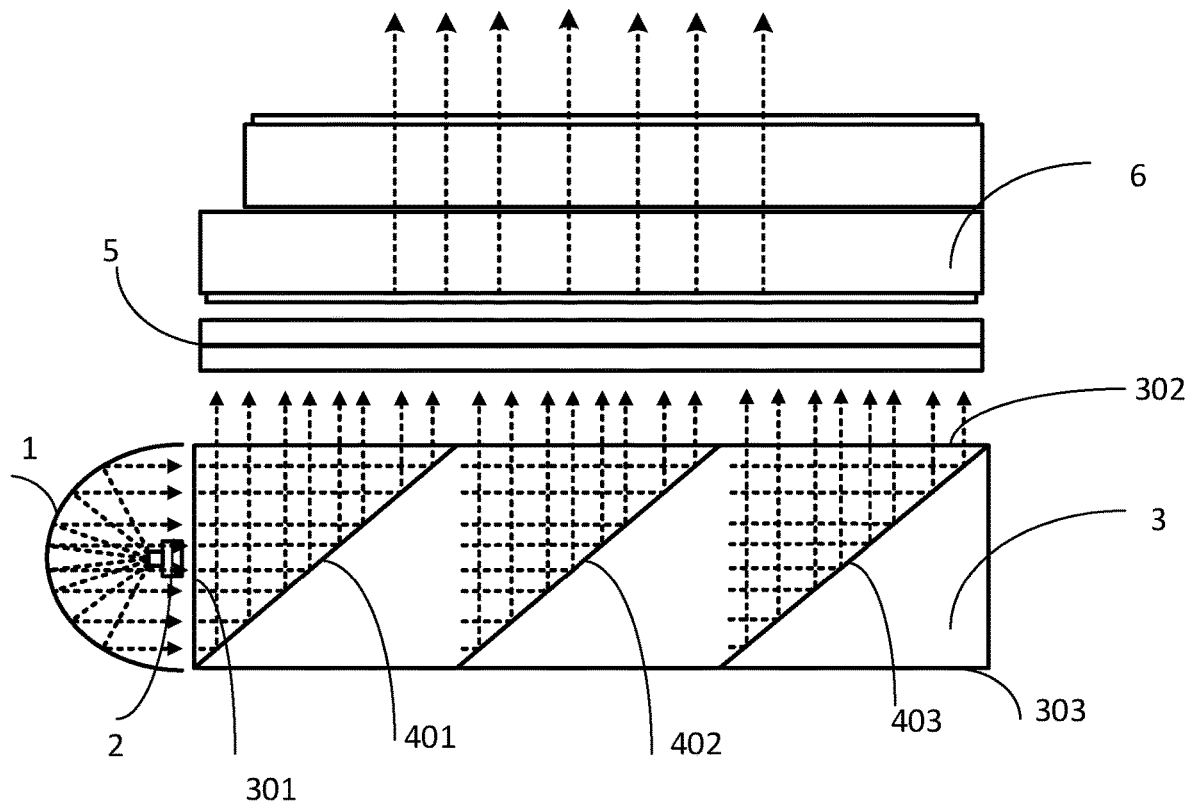
FIG. 2 is a schematic diagram showing a structure of an embodiment of a display device according to the present disclosure.

Further, by referring to FIG. 2, an embodiment of this disclosure further provides a display device that can be a liquid crystal display device, or an organic electroluminescent display device, or an electrowetting display device. The display device can be selected as needed in actual applications, and this disclosure does not limit this. The display device can be a display panel, or any product or member having a display function, such as mobile phone, tablet computer, TV set, notebook computer, digital camera, navigator. This embodiment takes the liquid crystal display device as an example to describe implementations of the solution.

Specifically, the display device comprises the backlight module described above and a liquid crystal layer 5 arranged on the light emitting surface 302 of the backlight module, and the liquid crystal layer 5 can regulate an emission state of the parallel light rays emitted from the backlight module under an action of an external electric field. For the descriptions of the backlight module, please refer to the details described in the foregoing, and they are omitted here. In some embodiments, the display device in this disclosure is a planar display or a curved display with a backlight module, such as a liquid crystal display device. In other embodiments, the display device in this disclosure may be other types of display device. The backlight module in this disclosure can also be used in other devices with a backlight module. In some embodiments, the display device further comprises a panel 6 arranged on the liquid crystal Layer 5.

Figure 3:
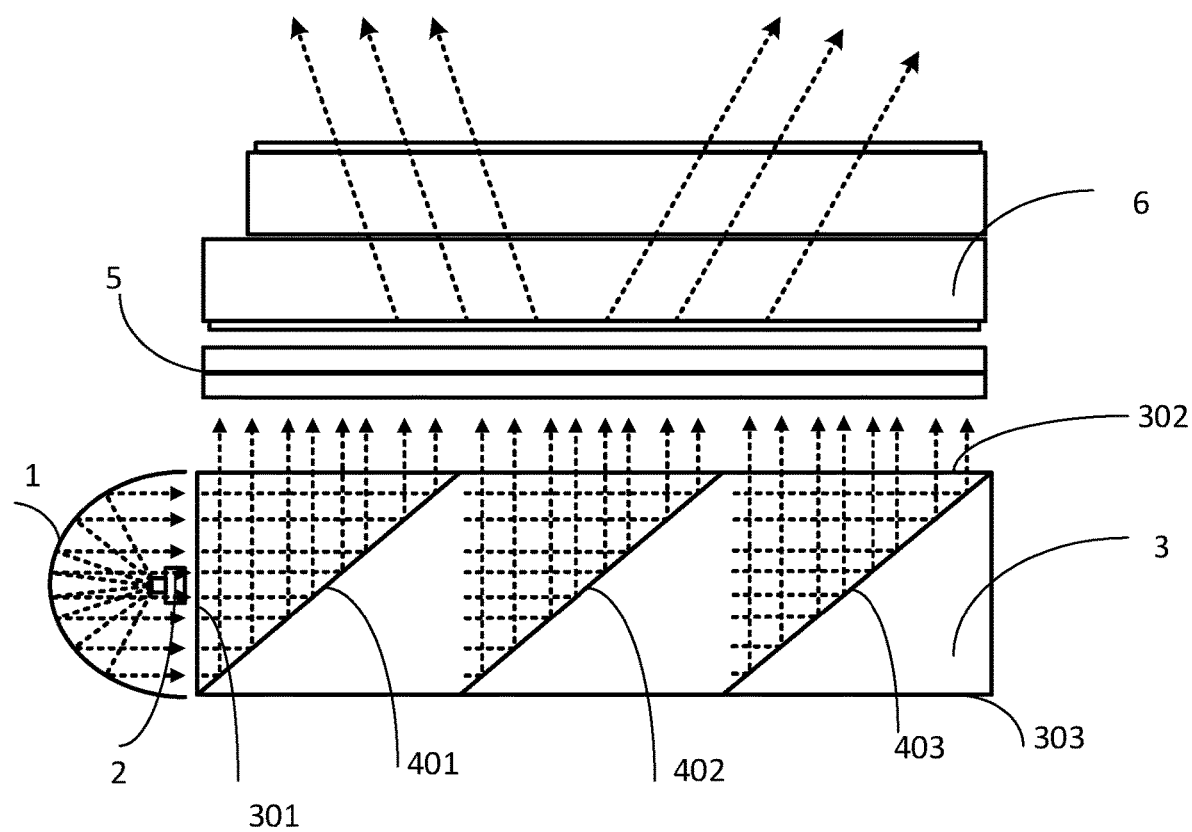
FIG. 3 is a schematic diagram showing a structure of another embodiment of a display device according to the present disclosure.

In an exemplary embodiment of this disclosure, the liquid crystal layer 5 comprises a polymer dispersed liquid crystal (PDLC), which achieves the display function by adjusting a refractive index matching degree of the liquid crystal/polymer. When a voltage is applied, liquid crystal molecules in the PDLC move in the direction of the electric field, the effective refractive index of the liquid crystal matches the refractive index of the polymer matrix, which forms a substantially homogeneous medium, and the transparent state makes the parallel light rays emitted from the light emitting surface 302 of the light guide plate 3 directly pass through, that is, the parallel light rays are emitted from the PDLC in parallel. See FIG. 2, the display device presents a narrow angle of view and has an anti-peep effect; when the applied voltage is removed, the movement of the liquid crystal molecules dispersed in the PDLC is in a disordered state, the effective refractive index of the liquid crystal does not match the refractive index of the polymer matrix, and the parallel light emitted from the light emitting surface 3 of the light guide plate 3 is strongly scattered, that is, the parallel light rays are divergently emitted from the PDLC. See FIG. 3, the display device presents a wide angle of view. It is not difficult to understand that, the use of PDLC eliminates the use of an optical film material such as the anti-peep sheet, and the removal of the anti-peep sheet eliminates its absorption loss of light, improves the on-state permeability of the PDLC and reduces the energy consumption of the display device. Moreover, the PDLC has a fast switching performance in the order of milliseconds, and can quickly switch the angle of view of the display device.

It should be noted that, switching between the parallel emission state mode and the divergent emission state mode of the parallel light rays on the display device can be achieved by using a touch key arranged on the display device or a physical keyboard of a terminal connected with the display device. When needed, a corresponding circuit can be provided to perform a switching control of the key, and other hardware and software devices can be combined as needed. It is not difficult to understand that, the display device in this solution can realize two different light exit angles by means of "one-button control", thereby presenting two different angles of view (e.g., wide and narrow) on the display device, which is easy to operate and enhances the user experience.

In summary, an embodiment of this disclosure provides a display device comprising the backlight module as described above and a liquid crystal layer 5 arranged on the light emitting surface 302 of the backlight module. The liquid crystal layer 5 can regulate the emission state of the parallel light emitted from the backlight module, thereby changing the angle of view of the display device to realize the anti-peep protection; by only providing a control button for regulating the liquid crystal layer 5, the light emission angle of view of the display device can be controlled with one button to be flexibly switched between the anti-peep mode and the normal mode, which is easy to operate and improves the user experience.

Although some exemplary embodiments of the present disclosure are described above, those skilled in the art would appreciate that, various variations may be made to the exemplary embodiments without departing from the spirit and scope of the present disclosure, and the scope of patent protection of the present disclosure is still determined by the claims and their equivalents.

What is claimed is:

1. A backlight module for anti-peeping comprising:
a light guide plate; and
a light-emitting assembly configured to emit light rays and cause the light rays as emitted to be incident to the light guide plate in parallel with a bottom surface at a bottom of the light guide plate;
wherein the light guide plate further comprises a light incident surface on a side surface thereof, the bottom surface, a light emitting surface on the top thereof, and at least one reflective sloped surface, wherein the at least one reflective sloped surface is positioned between the bottom surface and the light emitting surface, and an angle between the at least one reflective sloped surface and a plane of the bottom surface extending in a direction away from the light incident surface is less than 90°,
wherein a plurality of reflective sloped surfaces are provided, wherein the plurality of reflective sloped surfaces are arranged into multiple stages of reflective sloped surface, wherein each stage of reflective sloped surface has at least one of a different transmittance or a different reflectivity, and wherein the light emitted by the light emitting assembly is reflected by the plurality of reflective sloped surfaces in parallel;
wherein the light-emitting assembly comprises a light-emitting device and a reflector that has a parabolic structure to encapsulate the light-emitting device, wherein the light-emitting device is positioned on a side of the light guide plate near the light incident surface, and a light-emitting layer of the light-emitting device is merely provided on a side of the light-emitting device facing away from the light incident surface, such that the light emitted by the light emitting device is reflect by the parabolic structure before being incident to the light guide plate in parallel with the bottom surface at the bottom of the light guide plate; and
wherein a center of the light-emitting layer of the light-emitting device is located at a focus position of the parabolic structure.

2. The backlight module according to claim 1, wherein each stage of reflective sloped surface comprises one or more reflective sloped surfaces.

3. The backlight module according to claim 1, wherein the light-emitting device comprises an LED, an OLED, or a laser light source.

4. The backlight module according to claim 1, wherein the angle between the at least one reflective sloped surface and the plane of the bottom surface extending in the direction away from the light incident surface is about 45°.

5. A display device comprising the backlight module according to claim 1.

6. The display device according to claim 5, further comprising a liquid crystal layer for regulating an emission state of the parallel light rays emitted from the backlight module, wherein the liquid crystal layer is arranged above the light emitting surface of the backlight module.

7. The display device according to claim 6, wherein the liquid crystal layer comprises a polymer dispersed liquid crystal.

8. The display device according to claim 6, wherein the emission state includes a parallel emission state and a divergent emission state.

9. The display device according to claim 6, further comprising a panel arranged on the liquid crystal layer.

10. The display device according to claim 6, wherein the light-emitting device comprises an LED, an OLED, or a laser light source.

11. The display device according to claim 5, wherein the angle between the at least one reflective sloped surface and the plane of the bottom surface extending in the direction away from the light incident surface is about 45°.

12. A backlight module for anti-peeping comprising:
a light guide plate; and
a light-emitting assembly configured to emit light rays and cause the light rays as emitted to be incident to the light guide plate in parallel with a bottom surface at a bottom of the light guide plate;
wherein the light guide plate further comprises a light incident surface on a side surface thereof, the bottom surface, a light emitting surface on the top thereof, and at least one reflective sloped surface, wherein the at least one reflective sloped surface is positioned between the bottom surface and the light emitting surface, and an angle between the at least one reflective sloped surface and a plane of the bottom surface extending in a direction away from the light incident surface is less than 90°,
wherein a plurality of reflective sloped surfaces are provided, wherein the plurality of reflective sloped surfaces are arranged into multiple stages of reflective sloped surface, wherein each stage of reflective sloped surface has at least one of a different transmittance or a different reflectivity, and wherein the light emitted by the light emitting assembly is reflected by the plurality of reflective sloped surfaces in parallel;
wherein the light-emitting assembly comprises a light-emitting device and a collimating lens, wherein the collimating lens is positioned between the light-emitting device and the light incident surface, and a light-emitting layer of the light-emitting device faces the collimating lens, such that the light emitted by the light-emitting device leaves the collimating lens in parallel with the bottom surface of the light guide plate.

13. The display device according to claim 5, wherein each stage of reflective sloped surface comprises one or more reflective sloped surfaces.

14. A display device comprising the backlight module according to claim 13.

15. The display device according to claim 14, further comprising a liquid crystal layer for regulating an emission state of the parallel light rays emitted from the backlight module, wherein the liquid crystal layer is arranged above the light emitting surface of the backlight module.

16. The backlight module according to claim 15, wherein each stage of reflective sloped surface comprises one or more reflective sloped surfaces.

17. The backlight module according to claim 15, wherein the light-emitting device comprises an LED, an OLED, or a laser light source.

18. The backlight module according to claim 15, wherein the angle between the at least one reflective sloped surface and the plane of the bottom surface extending in the direction away from the light incident surface is about 45°.

* * * * *